(12) United States Patent
Yamada

(10) Patent No.: US 9,507,549 B2
(45) Date of Patent: Nov. 29, 2016

(54) COMMUNICATION SYSTEM, COMMUNICATION SETUP METHOD, AND TERMINAL DEVICE

(71) Applicant: Seiko Epson Corporation, Tokyo (JP)

(72) Inventor: Yusuke Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/789,523

(22) Filed: Jul. 1, 2015

(65) Prior Publication Data

US 2016/0004489 A1  Jan. 7, 2016

(30) Foreign Application Priority Data

Jul. 3, 2014  (JP) .................................. 2014-137818

(51) Int. Cl.
G06F 3/12 (2006.01)
H04W 84/12 (2009.01)

(52) U.S. Cl.
CPC .......... G06F 3/1236 (2013.01); G06F 3/1204 (2013.01); G06F 3/1292 (2013.01); H04W 84/12 (2013.01)

(58) Field of Classification Search
None
See application file for complete search history.

(56) References Cited

U.S. PATENT DOCUMENTS

| | | | |
|---|---|---|---|
| 6,976,161 B2 * | 12/2005 | Nelson | H04N 1/00 235/375 |
| 2006/0017962 A1 * | 1/2006 | Burdette | H04N 1/00127 358/1.15 |
| 2007/0030516 A1 * | 2/2007 | Tsuji | G06F 3/1204 358/1.15 |
| 2009/0036056 A1 * | 2/2009 | Oshima | H04M 1/7253 455/41.3 |
| 2011/0222118 A1 * | 9/2011 | Mukaiyama | G06F 3/1203 358/1.15 |
| 2012/0034868 A1 | 2/2012 | Fine et al. | |
| 2013/0057905 A1 * | 3/2013 | Okazawa | H04W 24/02 358/1.15 |
| 2013/0094047 A1 * | 4/2013 | Bailey | H04L 63/18 358/1.14 |
| 2013/0215467 A1 * | 8/2013 | Fein | G06F 3/1204 358/1.15 |
| 2014/0118778 A1 * | 5/2014 | Lee | H04N 1/00127 358/1.15 |
| 2014/0240776 A1 * | 8/2014 | Suzuki | G06F 3/1296 358/1.15 |
| 2015/0002892 A1 * | 1/2015 | Maeda | H04N 1/32539 358/1.15 |
| 2015/0215480 A1 * | 7/2015 | Chiyo | H04N 1/00204 358/1.15 |

FOREIGN PATENT DOCUMENTS

| | | |
|---|---|---|
| JP | 2004-086492 A | 3/2004 |
| JP | 2012-523727 A | 10/2012 |

\* cited by examiner

*Primary Examiner* — Dung Tran
(74) *Attorney, Agent, or Firm* — Nutter McClennen & Fish LLP; John J. Penny, Jr.; Joshua I. Rudawitz

(57) ABSTRACT

A communication system has a printer that connects for a first to a wireless network; and a terminal device that has a second wireless communication unit for communication, and registers connection settings related to connecting to the wireless network in the printer. The terminal communicates with the printer by the second wireless communication unit and configures connection settings in the printer, connects by the second wireless communication unit to the wireless network, and can request the printer to execute a specific operation through the wireless network.

13 Claims, 15 Drawing Sheets

(A)

(B)

(A)

PLEASE CONFIRM THE SETTINGS.

MAC ADDRESS OF PRINTER: 11.22.33.44.55

NETWORK NAME (SSID): ABCD

SECURITY: None

IP ADDRESS: 111.222.333.444

SUBNET MASK: 255.255.255.0

DEFAULT GATEWAY: 111.222.333.1

(B)

RESTARTING PRINTER.
PLEASE WAIT.

COMMUNICATION SYSTEM, COMMUNICATION SETUP METHOD, AND TERMINAL DEVICE

Priority is claimed under 35 U.S.C. §119 to Japanese Application no. 2014-137818 filed Jul. 3, 2014 is hereby incorporated by reference in their entirety.

BACKGROUND

1. Technical Field

The present disclosure relates to a communication system, a communication setup method, and a terminal device in the communication system.

2. Related Art

Communication technologies enabling communication between devices have advanced significantly, and many different kinds of devices now come with many different kinds of communication functions. See, for example, Japanese translation of PCT international application JP-T-2012-523727. Near-field communication using contactless tags such as described in JP-T-2012-523727 enables communication without a complicated setup process. Conventional communication methods with advanced communication capabilities, on the other hand, require the user to specify certain communication related settings, such as identifying the party or the address with which to communicate. Considering the difficult of setting the device name or device ID of the other party, or setting the wireless address and passwords for communication between devices, JP-A-2004-86492, for example, discloses a method of assisting making these settings. The method of JP-A-2004-86492 extracts communication parameters from an image taken with a camera to configure the communication interface.

The method of JP-A-2004-86492, however, requires the device using the method to have a camera, and cannot be used in devices that do not have a camera or similar imaging means. In addition, when checking that operation using the communication function is actually possible after communication is set up requires operating the devices that communicate. Configuring communication in a device with limited input functions and checking operation after communication is set up is therefore not easy compared with setting up a device having many functions.

SUMMARY

The present disclosure is directed to this problem, and an objective of the disclosure is to provide a communication system, a communication setup method, and a terminal device enabling easily configuring communication related settings and checking operation after configuration is completed when setting up communication for a device that communicates even if the device being configured does not have many different functions.

To achieve the foregoing objective, a communication system according to the disclosure has a connecting device that connects to a first network; and a terminal device that has a communication unit to communicate, and configures connection settings related to connecting to the first network in the connecting device. When the communication unit is connected to a second network different from the first network, the terminal device changes a setting of the communication unit and connects to the connecting device, communicates with the connecting device by the communication unit to make connection settings in the connecting device, and after completing the connection settings, changes a setting of the communication unit and reconnects to the second network. Before reconnecting to the second network after making the connection settings, the terminal device operates the communication unit using settings corresponding to the connection settings registered in the connecting device to connect to the first network, and goes to a state enabling requesting the connecting device to execute a specific operation through the first network.

Thus comprised, the terminal device can control configuring a connecting device connecting for the first time to a first network, and the terminal device can request the connecting device to execute a specific operation. As a result, after setting up the connection of the connecting device, the terminal device that made the connection settings can check the operation of the connecting device. Communication related settings can therefore be easily registered, and device operation after communication is enabled can be easily confirmed.

The terminal device can also connect to the first network to which the connecting device connected. The connecting device and the terminal device can also connect by wireless communication, and the connection settings of the connecting device can be configured by wireless communication.

The connection settings of a connecting device can be made using a terminal device that is connected to a second network different from the first network to which the connecting device connects, and after completing the connection settings the terminal device can connect to the second network and return to the second network.

In a communication system according to another aspect of the disclosure, the connecting device has a first wireless communication unit, and the communication unit of the terminal device is configured to communicate wirelessly; and the terminal device communicates by the communication unit with the connecting device, and configures the connection settings of the first wireless communication unit to connect to the first network.

Thus comprised, a connecting device and a terminal device can connect by wireless communication, and the connection settings of the connecting device can be set by wireless communication.

In a communication system according to another aspect of the disclosure, the terminal device has a display unit to display guidance for input related to requesting executing a specific operation, and an input unit to receive input related to requesting executing a specific operation, and requests the connecting device to execute the specific operation according to the input received by the input unit.

Thus comprised, when input of a request for a specific operation received, the connecting device can be requested to execute a specific operation.

In a communication system according to another aspect of the disclosure, the terminal device displays on the display unit at least one of the result of requesting the connecting device to execute a specific operation, and the result of the connecting device executing the specific operation.

The user can therefore know at least one of the result of requesting the connecting device to execute a specific operation, and the result of the connecting device executing the specific operation, from the content displayed on the display unit.

In a communication system according to another aspect of the disclosure, the communication unit of the terminal device and the first wireless communication unit of the connecting device wirelessly connect directly to each other.

Thus comprised, the connecting device and the terminal device can connect easily 1:1, and the connection settings of the first network to which the connecting device connects can be controlled by the terminal device.

Another aspect of the disclosure is a communication setup method wherein a terminal device with a communication unit that communicates configures connection settings of a connecting device that connects to a first network, including: the terminal device, when the communication unit is connected to a second network different from the first network, changing a setting of the communication unit and connecting to the connecting device, communicating with the connecting device by the communication unit and registering connection settings related to connecting to the first network in the connecting device, and after registering the connection settings, changing a setting of the communication unit and reconnecting to the second network; and before reconnecting to the second network after registering the connection settings, the terminal device operating the communication unit using settings corresponding to the connection settings registered in the connecting device to connect to the first network, and going to a state enabling requesting the connecting device to execute a specific operation through the first network.

Thus comprised, the terminal device can control configuring a connecting device connecting for the first time to a first network, and the terminal device can request the connecting device to execute a specific operation. As a result, after setting up the connection of the connecting device, the terminal device that made the connection settings can check the operation of the connecting device. Communication related settings can therefore be easily registered, and device operation after communication is enabled can be easily confirmed.

Another aspect of the disclosure is a terminal device including: a communication unit that can communicate with a connecting device that connects to a first network; and a control unit that controls the communication unit; wherein the control unit, when the communication unit is connected to a second network different from the first network, changes a setting of the communication unit and connects to the connecting device, communicates with the connecting device by the communication unit and registers connection settings related to connecting to the first network in the connecting device, and after registering the connection settings, changes a setting of the communication unit and reconnects to the second network; and before reconnecting to the second network after registering the connection settings, the control unit operates the communication unit using settings corresponding to the connection settings registered in the connecting device to connect to the first network, and goes to a state enabling requesting the connecting device to execute a specific operation through the first network.

Thus comprised, the terminal device can control configuring a connecting device connecting for the first time to a first network, and the terminal device can request the connecting device to execute a specific operation. As a result, after setting up the connection of the connecting device, the terminal device that made the connection settings can check the operation of the connecting device. Communication related settings can therefore be easily registered, and device operation after communication is enabled can be easily confirmed.

Other objects and attainments together with a fuller understanding of the disclosure will become apparent and appreciated by referring to the following description and claims taken in conjunction with the accompanying drawings.

DESCRIPTION OF EMBODIMENTS

Figure 1:
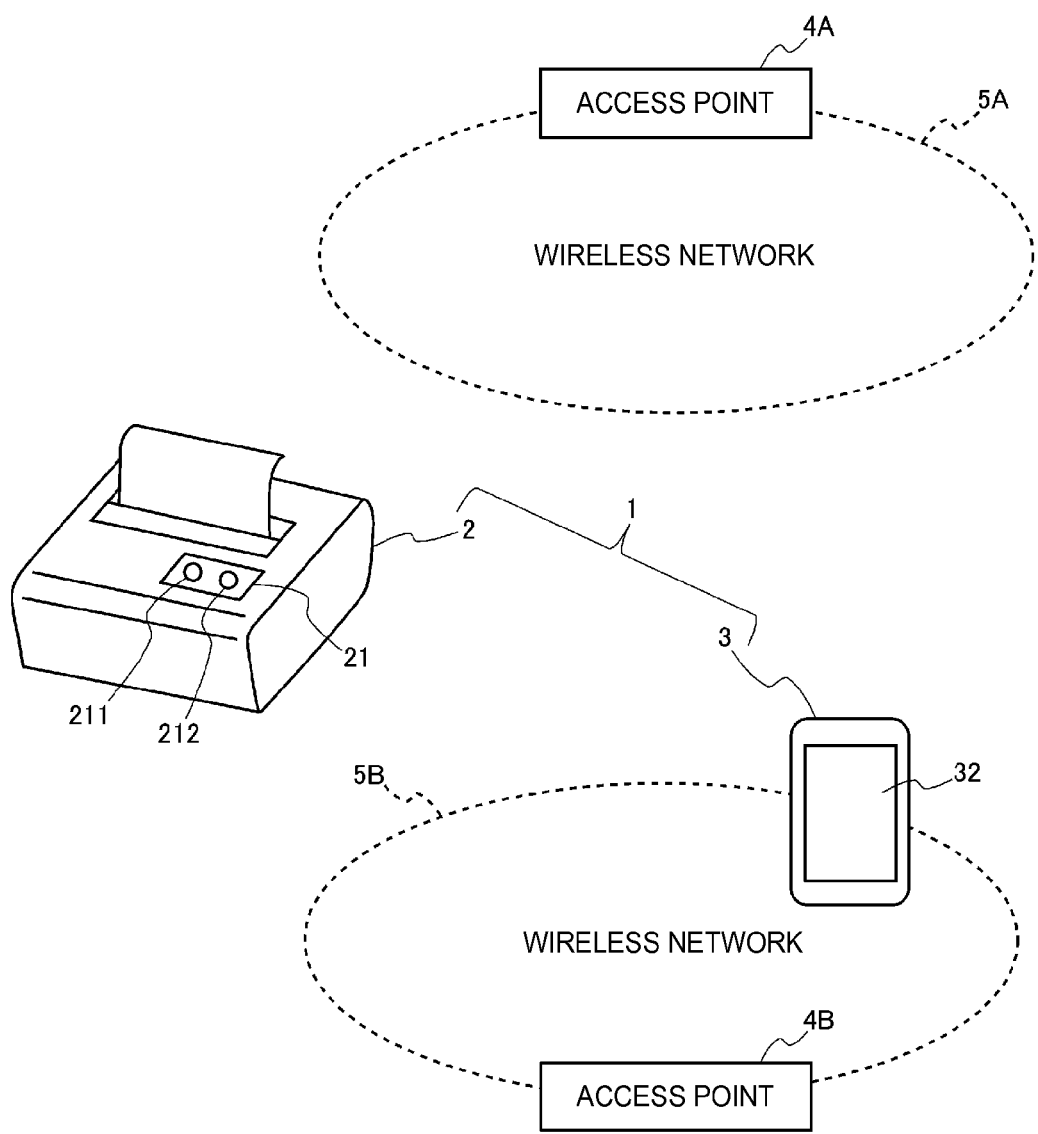
FIG. 1 illustrates the configuration of a communication system.

A preferred embodiment of the present disclosure is described below with reference to the accompanying figures. FIG. 1 illustrates the communication system 1.

The communication system 1 includes a printing device (printer) 2 and a terminal device (terminal) 3. The printer 2 is a mobile printer that can be worn by the user on the hip or carried in a suitable case, for example. The terminal 3 is a device with a communication function as described below, and in this example is a tablet computer with a touch panel 32.

The terminal 3 embodies a mobile POS system using the terminal 3 as a POS (point-of-sale) terminal. The printer 2 is used for printing receipts, for example, in the POS system.

Shown in FIG. 1 are wireless network 5A with an access point 4A, and wireless network 5B with an access point 4B. Access point 4A is a device for relaying communication between devices on the wireless network 5A, and may include the functions of a network router or bridge. Access point 4B is the same.

Wireless networks 5A and 5B operate as independent POS systems. More specifically, wireless network 5A connects multiple devices including a printer 2 and terminal 3 to each other, and operates as a POS system by the functions of the devices. Likewise, wireless network 5B connects multiple devices including a printer 2 and terminal 3 to each other, and operates as a POS system by the functions of the devices.

Note that access point 4A and access point 4B are referred to as simply access point 4 unless it is necessary to differentiate them, and wireless network 5A and wireless network 5B are referred to as simply wireless network 5 unless it is necessary to differentiate them.

The wireless network 5A has a network identifier that distinguishes the wireless network 5A from other wireless networks. Wireless network 5B also has a network identifier.

The network identifiers are specific to the wireless networks 5A and 5B, and the network identifier of wireless network 5A therefore differs from the network identifier of wireless network 5B.

Devices that connect to wireless network 5A have unique network information that distinguishes one device from other devices on the wireless network 5A. This network information is information unique to each device on the wireless network 5A. The devices that connect to wireless network 5B likewise have unique network information that distinguishes one device from other devices on the wireless network 5B.

The wireless networks 5A and 5B can thus be identified by their network identifiers. Devices that connect to the wireless networks 5A and 5B can also be identified by the network information on the respective wireless networks 5A and 5B.

The wireless networks 5A and 5B may also have respective key information for limiting connections. In this event, connection by unrelated devices to the wireless networks 5A and 5B can be prevented.

In one embodiment of the disclosure the wireless networks 5A and 5B may be wireless LAN (local area networks) based on an IEEE 802.11x standard, and more particularly are described as WiFi™ networks. In this configuration, the network identifier is a SSID (Service Set Identifier), and the key information includes a pass phrase and encryption method. The pass phrase is the encryption key used to encrypt communications over the wireless LAN, and the encryption method may, for example, be WEP (Wired Equivalent Privacy), WPA (Wi-Fi Protected Access), or extensions or improvements of these methods. The network information is an IP address, for example.

The printer 2 and terminal 3 in this embodiment have one SSID and one key information set, and connect to wireless network 5A or wireless network 5B using the SSID and key information. For brevity, configurations having plural SSIDs and information sets are not considered here.

The operation whereby the terminal 3 configures a connection to connect a new printer 2 that is part of the communication system 1 to the wireless network 5A is described next.

The operation is outlined first. Because the printer 2 does not have the SSID and key information required to connect to the wireless network 5A, it cannot connect to the wireless network 5A. The terminal 3, however, is already connected to the wireless network 5B. This is only one example, however, and the terminal 3 may not be connected to either wireless network 5A or wireless network 5B, or it may be connected to wireless network 5A.

To open a connection, the printer 2 first goes to a mode (first mode) for communicating using a default SSID and key information. The default SSID differs from the SSIDs of the wireless networks 5A and 5B. The terminal 3 also goes to a mode (first mode) for communicating by a preset SSID and key information. This SSID and key information are the same as the default SSID and key information of the printer 2. Because the terminal 3 communicates in the first mode using a different SSID than the SSIDs of the wireless networks 5A and 5B, the terminal 3 does not connect to the wireless networks 5A and 5B. As a result, while the printer 2 and terminal 3 can communicate with each other, they do not connect to the wireless networks 5A and 5B. In the first mode, the printer 2 and terminal 3 may operate in an ad hoc mode according to the IEEE 802.11 standard, or the printer 2 or the terminal 3 may operate as an access point. In the first mode, the connection settings of the wireless network 5A, or more specifically the SSID and key information, are set in the printer 2, and the printer 2 can connect to the wireless network 5A.

The printer 2 is used as an example of the connecting device in this description, but the connecting device is not limited to the printer 2. For example, the connecting device may be a scanner that reads images, or a display device that displays images.

The communication system 1 may also have multiple printers 2 or connecting devices other than printers 2, in which case the terminal 3 may execute the following operation for each connecting device and configure the connection. The number of terminals 3 is also not specifically limited, and if the communication system 1 has multiple terminals 3, each terminal 3 may execute the operation described below to configure the connection for each connecting device. Further alternatively, the types and numbers of other devices that connect to the wireless networks 5A and 5B can be changed as desired.

The printer 2 is described first below with reference to FIG. 2.

Figure 2:
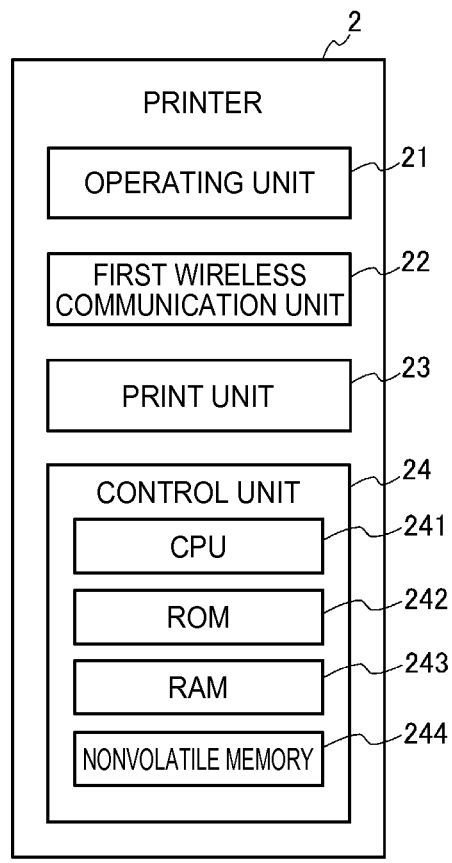
FIG. 2 is a block diagram of a printing device.

FIG. 2 is a block diagram illustrating the configuration of the printer 2. As shown in FIG. 2, the printer 2 includes an operating unit 21, a first wireless communication unit 22, a print unit 23, and a control unit 24.

Operating buttons are disposed to the operating unit 21. In this embodiment, the operating buttons include a power button 211 and a connection setup button 212 (see FIG. 1). The power button 211 is an operating button for turning the power of the printer 2 on/off. The connection setup button 212 is an operating button for causing the printer 2 to communicate wirelessly according to previously set communication settings, and execute a connection mode (first mode below) for connecting wirelessly to the terminal 3. The communication setup of the printer 2 for wireless communication in the first mode is described further below.

The first wireless communication unit 22 has a network interface card (NIC) as a wireless communication device, and communicates wirelessly over a wireless LAN (such as WiFi). More specifically, the first wireless communication unit 22 has the ability to communicate with the access points 4A, 4B, and with the second wireless communication unit 34 of the terminal 3 described further below.

The print unit 23 has a printhead (a thermal head in this example), and prints print data on receipt paper or other print media as controlled by the print control unit 25 (FIG. 3) described below.

The hardware components of the control unit 24 include a CPU (Central Processing Unit) 241, ROM (Read Only Memory) 242, RAM (Random Access Memory) 243, and nonvolatile memory 244. A control program for controlling the printer 2 is stored in the ROM 242. RAM 243 is used as working memory of the CPU 241, and stores data used for operations by the CPU 241. The CPU 241 controls the operating unit 21, first wireless communication unit 22, and print unit 23 by executing operations based on the control program stored in ROM 242 using the RAM 243 as working memory. The default communication settings enabling the first wireless communication unit 22 to communicate wirelessly in the first mode described below are stored in nonvolatile memory 244. These communication settings include the SSID and pass phrase. The communication settings stored in nonvolatile memory 244 may include information identifying the communication protocol for wireless communication, the encryption method, and the IP address or other communication address. At least one other communication profile can be stored in addition to the default communication settings in the nonvolatile memory 244. This communication profile (settings) can be rewritten, and is stored based on information received from the terminal 3 in a process described further below.

The nonvolatile memory 244 is a storage device that retains stored data even after the printer 2 power turns off, and may be, for example, flash memory, EEPROM, SD card, or a magnetic storage device.

Figure 3:
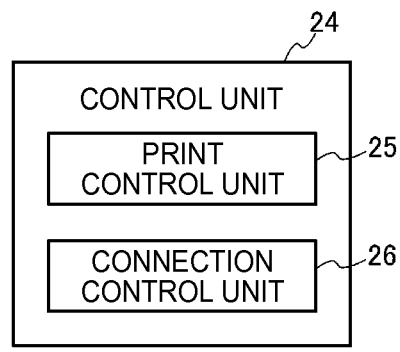
FIG. 3 is a function block diagram of the control unit of the printing device.

Functions embodied by the cooperation of hardware and software, such as the CPU 241 of the printer 2 executing a control program stored in ROM 242, are described with reference to FIG. 3. The function blocks of the control unit 24 include a print control unit 25 and connection control unit 26.

The print control unit 25 receives print data sent from the terminal 3. The print control unit 25 controls the print unit 23 to print the print data on receipt paper (produce a receipt).

The connection control unit 26 controls the first wireless communication unit 22 to communicate wirelessly in either the first mode or second mode. As described above, the first mode is a mode enabling child devices, such as the printer 2 and terminal 3, to communicate 1:1 without going through an access point 4 as the parent device. The second mode is a mode in which the child devices such as the printer 2 and terminal 3 communicate through an access point 4 as the parent device.

Figure 4:
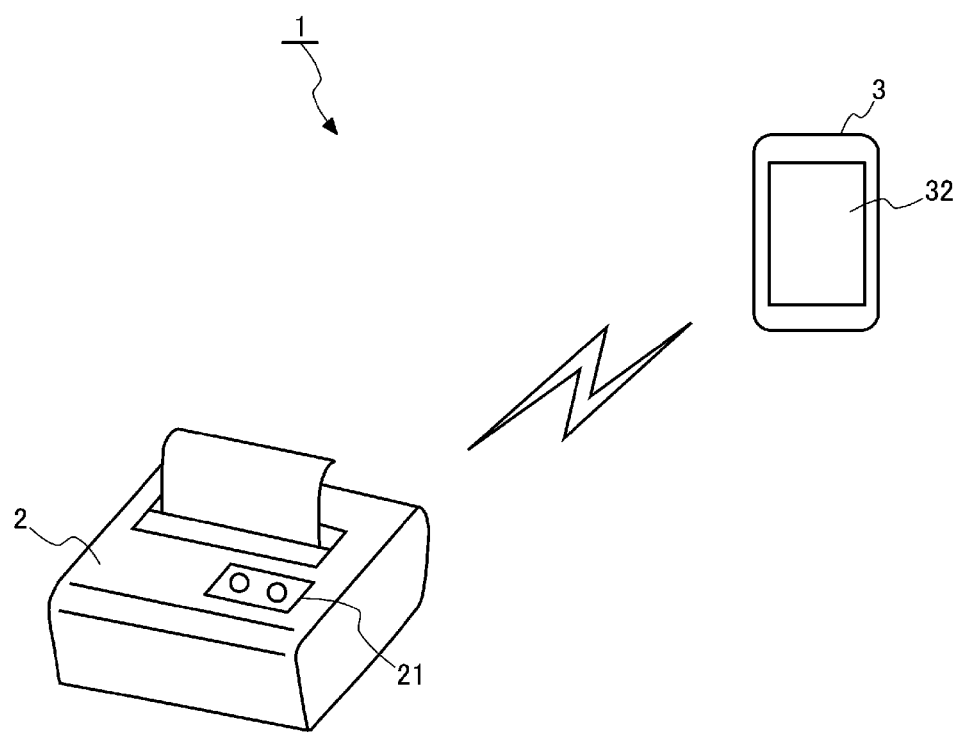
FIG. 4 illustrates a 1:1 wireless connection between a printing device and a terminal device.

Under specific conditions, the connection control unit 26 controls the first wireless communication unit 22 to communicate wirelessly in the first mode and connect wirelessly to the terminal 3. When connecting to the terminal 3, the printer 2 operates as an access point and connects wirelessly 1:1 to the terminal 3. Examples of this specific condition include, for example, the first time the printer 2 power turns on after factory shipping, and the connection setup button 212 on the operating unit 21 being pressed. Under such specific conditions, the connection control unit 26 sets the first wireless communication unit 22 to the default communication settings stored in the nonvolatile memory 244, and communicates wirelessly through the first wireless communication unit 22 in the first mode. By setting the default SSID and pass phrase in the first wireless communication unit 22, the first wireless communication unit 22 communicates wirelessly with the terminal 3 in which the same SSID and pass phrase are set. The first wireless communication unit 22 that connected wirelessly to the terminal 3 communicates directly with the terminal 3 through the 1:1 wireless connection. FIG. 4 illustrates a direct, 1:1 wireless connection between the printer 2 and terminal 3 in the first mode.

The connection control unit 26 receives information about the connection settings from the terminal 3 that connected wirelessly in the first mode. Included in the connection settings information is information such as the network name (SSID), of the wireless network 5A to which the printer 2 is connected, the encryption method used for wireless communication, and the IP address, for example. The wireless network 5A to which the printer 2 connects is a network deployed by an access point 4A installed, for example, in a retail business, food service business, beauty parlor or salon, hotel, conference or event facility, hospital, or other space where a commercial, medical, or other type of service is provided.

Figure 5:
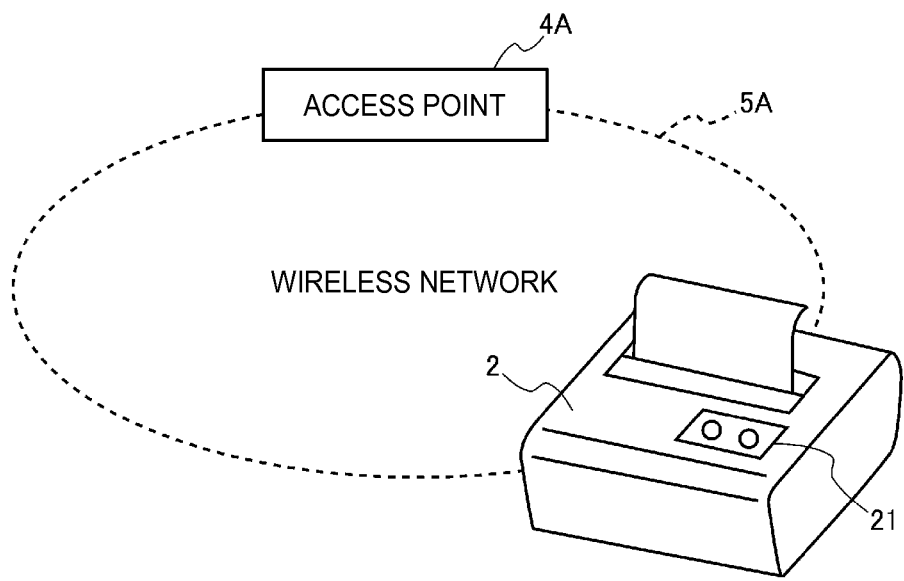
FIG. 5 illustrates a printing device wirelessly connected to an access point.

When connection settings information is received from the terminal 3, the connection control unit 26 changes the communication settings of the first wireless communication unit 22 according to the received connection settings, and restarts the printer 2. By restarting the printer 2, the 1:1 wireless connection between the printer 2 and terminal 3 is cancelled. After restarting, the first wireless communication unit 22 starts wireless communication in the second mode. Based on the connection settings, the first wireless communication unit 22 connects wirelessly to the access point 4A shown in FIG. 5, and connects to the wireless network 5A deployed by the access point 4A. As a result, the printer 2 joins the wireless network 5A of the access point 4A as a child device, and can communicate wirelessly with other child devices through the access point 4A.

Figure 6:
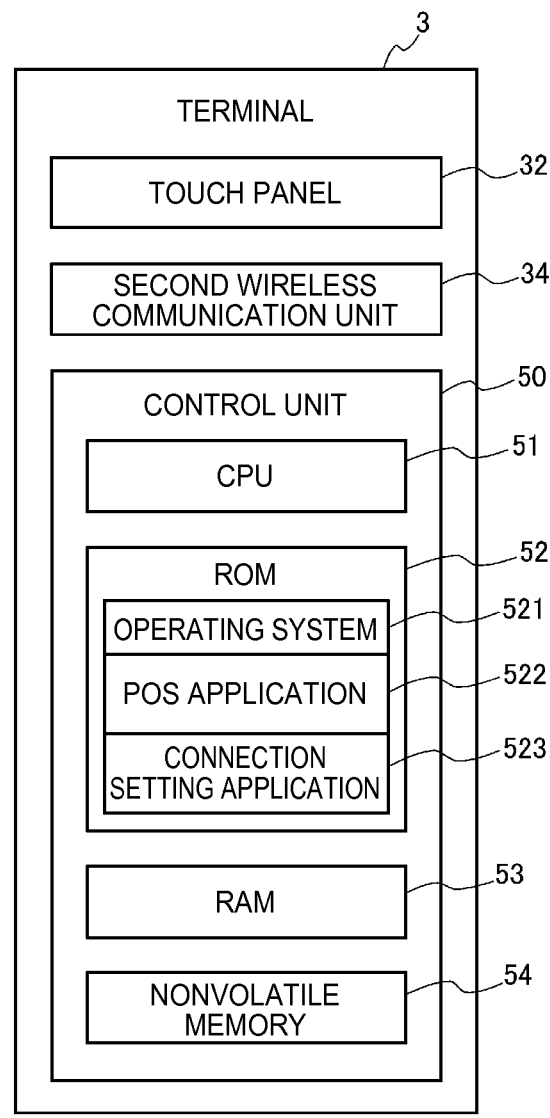
FIG. 6 is a block diagram of the terminal device.

The terminal 3 is described below with reference to FIG. 6. FIG. 6 illustrates an example of the configuration of a terminal 3. The terminal 3 may be a smartphone or tablet computer, for example. The terminal 3 has a touch panel 32, second wireless communication unit 34, and a control unit 50 that controls the touch panel 32 and second wireless communication unit 34.

As shown in FIG. 1, the touch panel 32 covers substantially the entire front of the terminal 3, and displays information as controlled by the control unit 50. The touch panel 32 has a capacitive or pressure sensitive sensor (not shown in the figure) that detects touch operations, and detects and receives input from touch operations on the touch panel 32 through the sensor.

The second wireless communication unit 34 communicates wirelessly by wireless LAN (such as WiFi™) as controlled by the control unit 50 described below. The second wireless communication unit 34 also has a first mode and a second mode as modes for wireless communication.

The hardware components of the control unit 50 include a CPU (Central Processing Unit) 51, ROM (Read Only Memory) 52, RAM (Random Access Memory) 53, and nonvolatile memory 54. The operating system (OS) 521, and control programs such as a POS application 522 and connection setting application 523 are stored in ROM 52. The operating system 521 may be iOS™, Android™, Windows RT™, Windows 8™ or other commonly used operating system. RAM 53 is used as working memory of the CPU 51, and stores data used for operations by the CPU 51. Functions embodied by the CPU 51 running a control program stored in ROM 52 are described below with reference to FIG. 7.

The communication settings used when configuring the printer 2 are stored in the nonvolatile memory 54 of the terminal 3. These communication settings include the SSID and pass phrase. These communication settings include the same information as the communication settings stored as the default communication settings in the nonvolatile memory 244 of the printer 2. The nonvolatile memory 54 and may be, for example, flash memory, EEPROM, SD card, or a magnetic storage device.

At least one other communication profile can be stored in addition to the communication settings for configuring the printer 2 in the nonvolatile memory 54. These communication settings can be rewritten, and are input and stored by operations on the touch panel 32.

Figure 7:
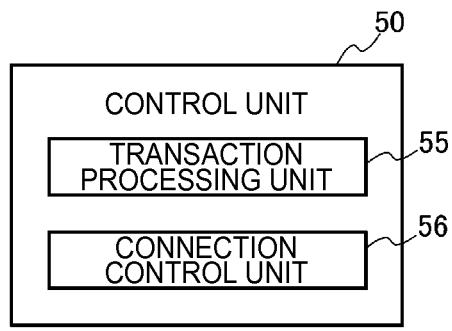
FIG. 7 is a function block diagram of the control unit of the terminal device.

The function blocks of the control unit 50 are described next with reference to FIG. 7. The function blocks of the control unit 50 include a transaction processing unit 55 that runs a transaction process, and a connection control unit 56 that runs the process for connecting to a wireless network 5. Note that the transaction processing unit 55 is embodied by the CPU 51 reading and running a POS application 522 stored in ROM 52. The connection control unit 56 is embodied by the CPU 51 reading and running the connection setting application 523 stored in ROM 52.

The transaction processing unit 55 runs the payment process (transaction process) based on product information input by the clerk or other operator through the touch panel 32. The transaction processing unit 55 generates print data for printing a receipt based on the payment information resulting from the payment process. When the second wireless communication unit 34 is connected to the wireless network 5A, the transaction processing unit 55 passes the generated print data to the second wireless communication unit 34. The second wireless communication unit 34 then sends the print data passed from the transaction processing unit 55 to a printer 2 on the wireless network 5A. The printer 2 receiving the print data then prints the print data on receipt paper, for example.

When input from a specific operation on the touch panel 32 is received, the connection control unit 56 controls the second wireless communication unit 34 to communicate wirelessly in the first mode, and connects wirelessly to the printer 2 communicating wirelessly in the same first mode. The connection control unit 56 controls the second wireless communication unit 34 to communicate wirelessly in the first mode by setting the second wireless communication unit 34 to the default communication settings stored in nonvolatile memory 54. By setting the default SSID and pass phrase in the second wireless communication unit 34, the second wireless communication unit 34 communicates wirelessly with the printer 2 set to the same SSID and pass phrase. The wirelessly connected second wireless communication unit 34 communicates directly with the printer 2 by 1:1 wireless communication. FIG. 4 illustrates a direct, 1:1 wireless connection between the printer 2 and terminal 3 in the first mode.

When a 1:1 wireless connection to the printer 2 is established, the connection control unit 56 displays an input window for connection settings on the touch panel 32. These connection settings are information for connecting the printer 2 to the wireless network 5A, and are, for example, connection information for an access point 4A installed in a space providing a specific commercial or medical service, for example. The communication settings may include the network name (SSID), the encryption method used for wireless communication, and the IP address. When a connection setting is received by input through the touch panel 32, for example, the connection control unit 56 sends the received connection setting to the printer 2 wirelessly connected in the first mode. The connection control unit 56 also stores the received connection setting in RAM 53.

Figure 8:
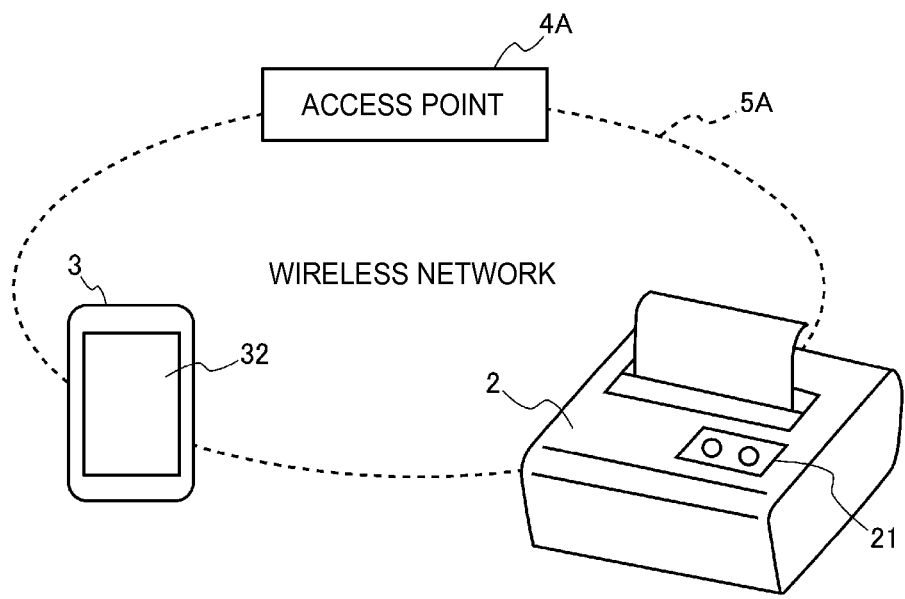
FIG. 8 illustrates a printing device and a terminal device wirelessly connected to an access point.

When the connection settings are completed, the connection control unit 56 changes the communication settings of the second wireless communication unit 34. For example, the connection control unit 56 registers the connection settings sent to the printer 2 in the second wireless communication unit 34. More specifically, the connection control unit 56 saves the same connection settings sent to the printer 2, including the network name (SSID) and wireless communication encryption method, in the second wireless communication unit 34. However, connection control unit 56 sets the communication address of the terminal 3 as the IP address or other communication address in the second wireless communication unit 34. The IP address of the terminal 3 may be set automatically by a DHCP (Dynamic Host Configuration Protocol) server, for example. Alternatively, the connection control unit 56 may display a prompt for inputting a generic IP address used only for print tests on the touch panel 32, and use the IP address received from the touch panel 32 for communication. The second wireless communication unit 34 for which the connection was configured by the connection control unit 56 communicates wirelessly with the access point 4A shown in FIG. 8, and connects to the wireless network 5A created by the access point 4A. As a result, the terminal 3 joins the wireless network 5A deployed by the access point 4A as a child device, and can communicate wirelessly through the access point 4A with other child devices such as the printer 2. In the example in FIG. 8, the printer 2 and terminal 3 are shown as child devices on the wireless network 5A created by the access point 4A.

The connection control unit 56 may be a device that cancels the 1:1 wireless connection to the printer 2 when connection settings are completed, and connect to a different wireless network than the wireless network 5A for connecting the printer 2. For example, the connection control unit 56 may connect wirelessly with the access point 4B to which it was connected before opening a 1:1 wireless connection to the printer 2, and return to wireless network 5B.

When the second wireless communication unit 34 connects to the access point 4A, the connection control unit 56 presents a display prompting input related to requesting executing a specific operation on the touch panel 32. A request for a specific operation in this embodiment of the disclosure is a request for a print test that causes a printer 2 connected to the same access point 4A to print a test pattern. When a scanner is connected wirelessly as the connected device to the access point 4A, a request for a specific operation may also be scan request causing the scanner wirelessly connected to the access point 4A to scan a specific test image.

When input for executing the print test on a printer 2 connected to the same access point 4A is input from the touch panel 32, the connection control unit 56 controls the transaction processing unit 55 to generate a test pattern to be printed by the printer 2. When the transaction processing unit 55 receives the test pattern request from the connection control unit 56, it generates and sends a specific test pattern to the connection control unit 56. The connection control unit 56 references the connection settings set in the second wireless communication unit 34 to get the IP address of the printer 2, and sends the generated test pattern to the acquired IP address.

The connection control unit 56 receives a termination state flag from the printer 2 to which the test pattern was sent indicating if the print test ended successfully or resulted in an error. When the connection control unit 56 receives the termination state flag, it presents a display based on the received termination state flag on the touch panel 32. More specifically, if the termination state flag indicates printing was successful, the connection control unit 56 may display a message indicating that the print test was successful on the touch panel 32 (see FIG. 9). If the termination state flag indicates an error, the connection control unit 56 displays a message indicating that the printing test resulted in an error on the touch panel 32. If the termination state flag is not received from the printer 2 to which the test pattern was sent before a specific timeout period passes, the connection control unit 56 displays a message indicating that the printing test resulted in an error on the touch panel 32.

When a scanner is connected as the connected device to the access point 4A, the connection control unit 56 also receives the result of the scanner scanning the test image from the scanner, and displays an appropriate message on the touch panel 32.

Figure 10:
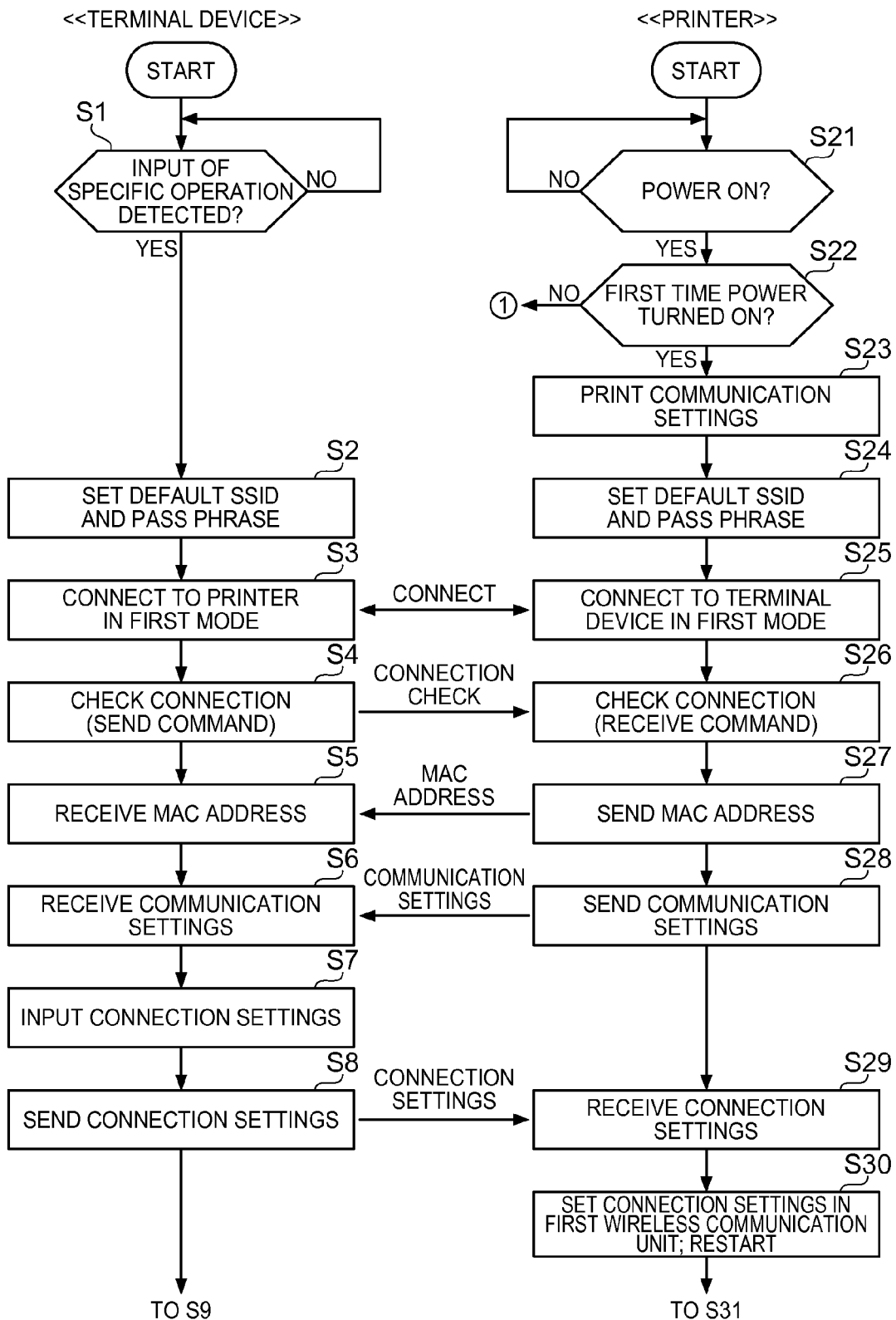
FIG. 10 is a flow chart a process executed by the terminal device and printing device.
Figure 11:
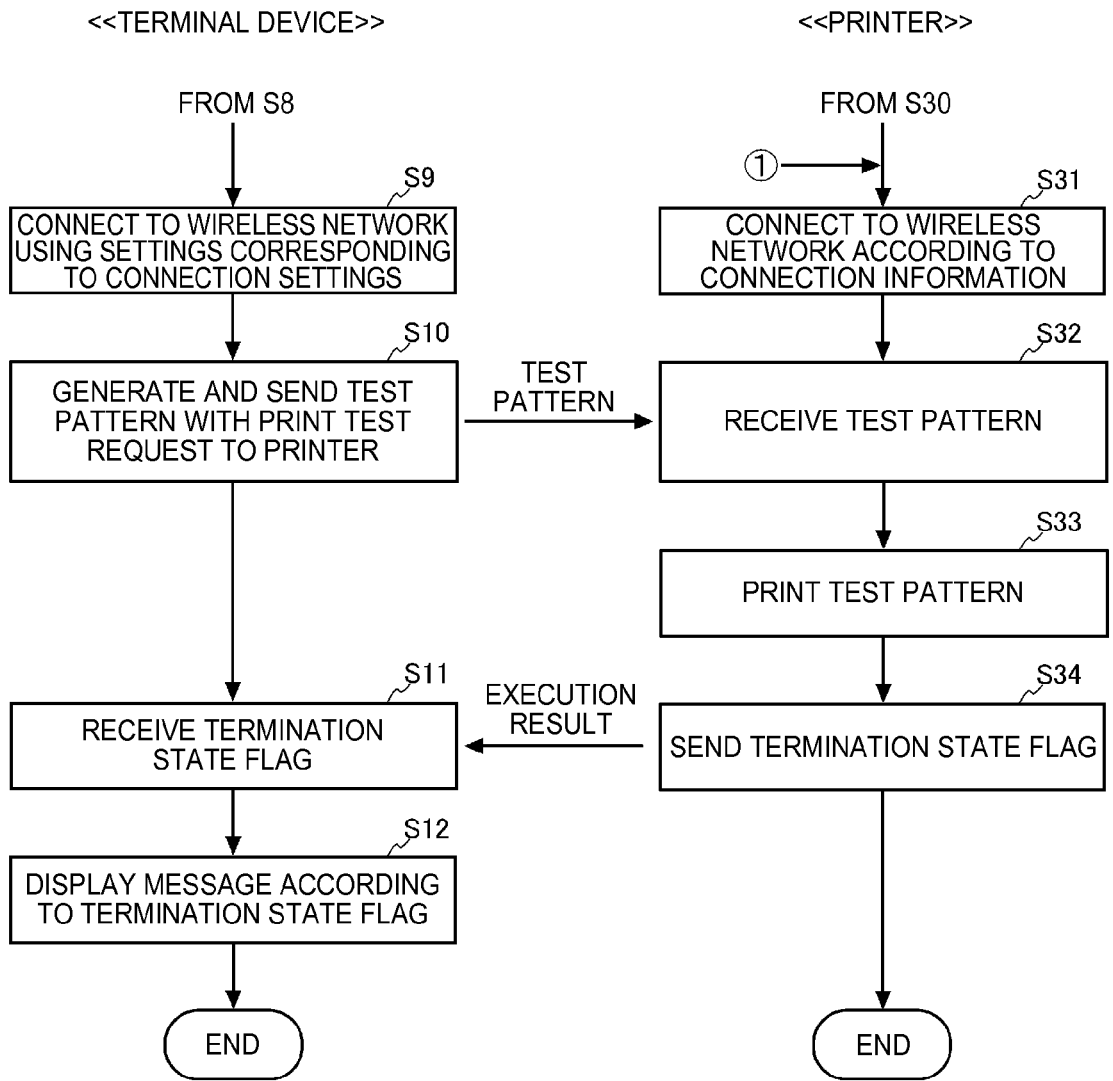
FIG. 11 is a flow chart a process executed by the terminal device and printing device.

Steps in the processes of the present disclosure are described below with reference to the flow chart in FIG. 10 and FIG. 11. FIG. 12 to FIG. 15 show examples of screens presented by the terminal 3 during execution of the steps in FIG. 10 and FIG. 11.

The connection control unit 56 of the terminal 3 first determines if input of a specific operation was received by the touch panel 32 (step S1). The specific input operation may be, for example, starting the connection setting application 523 and selecting displaying the connection settings displayed by the connection setting application 523 on the touch panel 32. If the result is yes, the connection control unit 56 sets the second wireless communication unit 34 for wireless communication in the first mode. The connection control unit 56 reads and sets the default communication settings, including the SSID that is the identifier of the wireless network 5 and the pass phrase that is the encryption key, from the nonvolatile memory 54 to the second wireless communication unit 34 (step S2).

If there is already a wireless connection to the access point 4B when display of the connection settings displayed by the connection setting application 523 on the touch panel 32 is selected, the connection control unit 56 sets the second wireless communication unit 34 to the first mode. More specifically, the connection control unit 56 cancels the wireless connection to the access point 4B, and reads and sets the default communication settings from the nonvolatile memory 54 to the second wireless communication unit 34 (step S2).

Figure 12:
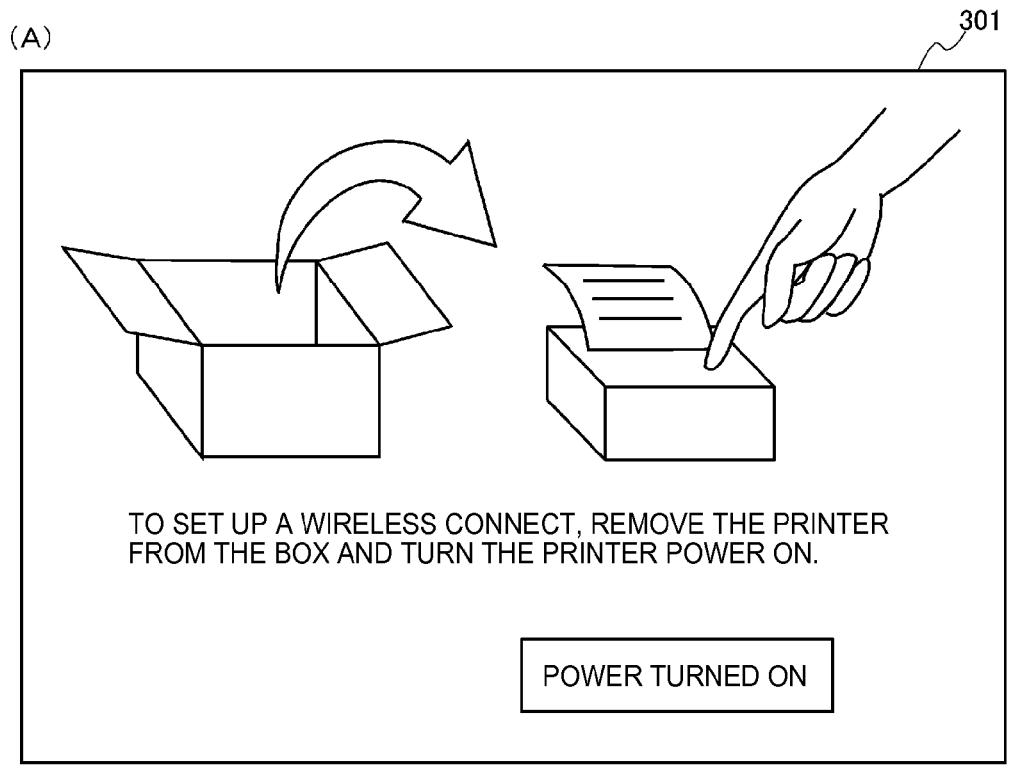
FIG. 12 shows examples of screens displayed on the terminal device.
Figure 12:
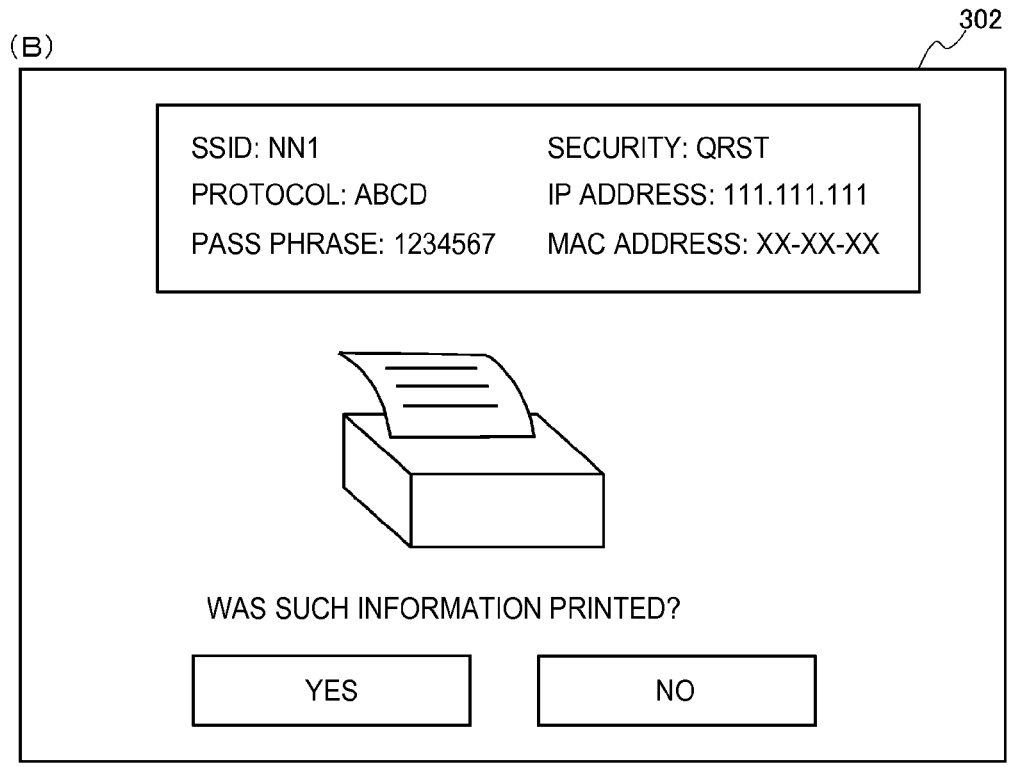

When the touch panel 32 detects the specific input operation (step S1 returns YES), the connection control unit 56 displays an initial guidance window 301 such as shown in FIG. 12 (A) on the touch panel 32. The initial guidance window 301 is a screen guiding starting setting up the printer 2.

When the printer 2 power turns on (step S21 returns YES), the printer 2 determines if the power turned on for the first time after factory shipping (step S22). If the printer 2 turned on for the first time after being shipped, the printer 2 prints the communication settings set in the printer 2 (step S23). The SSID and pass phrase stored in nonvolatile memory 244 are included in the communication settings printed at this time. More specifically, the communication settings are the SSID and pass phrase used by the printer 2 for communication in the first mode. The user refers to the printed communication settings to wirelessly connect the printer 2 and terminal 3 1:1 by manual settings.

The connection control unit 56 may also display a print confirmation window 302 such as shown in FIG. 12 (B) on the touch panel 32. The print confirmation window 302 tells the user that the printer 2 will print the communication settings, and prompts confirmation of the printing operation and the printed content.

The connection control unit 26 of the printer 2 then sets the first wireless communication unit 22 for wireless communication in the first mode. The connection control unit 26 reads and sets the default communication settings, including the SSID that is the identifier of the wireless network 5 and the pass phrase that is the encryption key from the nonvolatile memory 244, in the first wireless communication unit 22 (step S24). Note that the connection control unit 26 also configures the first wireless communication unit 22 for wireless communication in the first mode when the connection setup button 212 of the operating unit 21 is pressed. More specifically, the connection control unit 26 controls the first wireless communication unit 22 to communicate wirelessly in the first mode in the initial state in which the wireless network 5 with which to connect is not set, that is, the first time the printer 2 power turns on after shipment from the factory. The connection control unit 26 also controls the first wireless communication unit 22 to communicate wirelessly in the first mode when the connection setup button 212 is operated to connect to a new wireless network 5 even if wireless network 5A is already set as the network to connect to.

Figure 13:
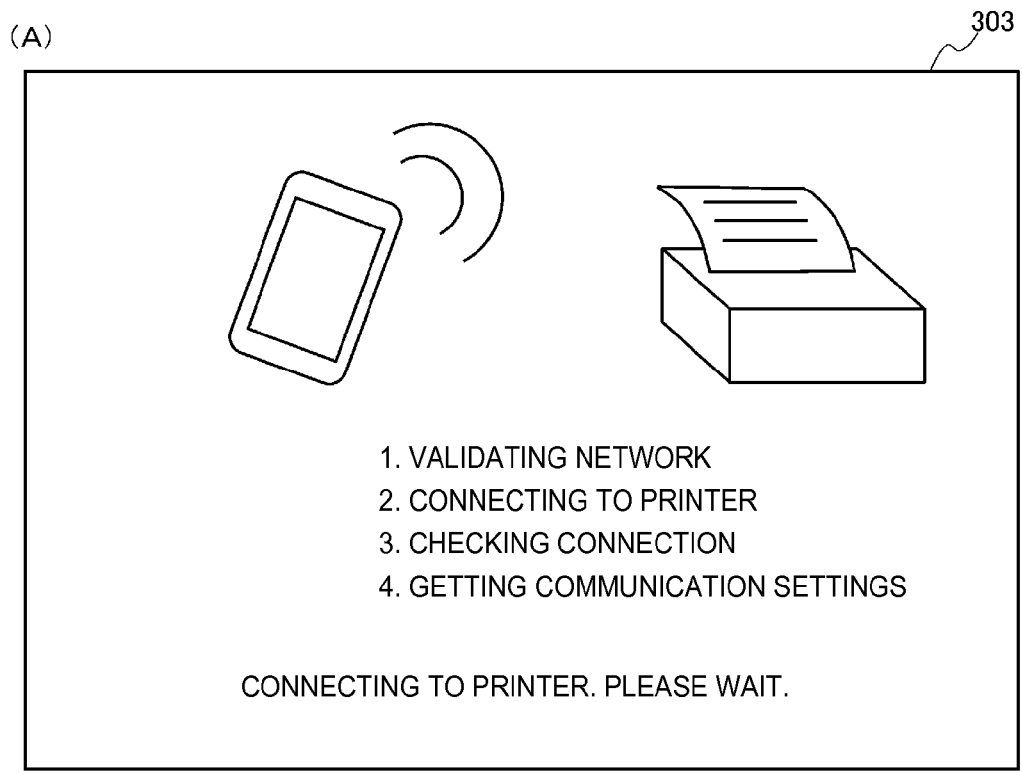
FIG. 13 shows examples of screens displayed on the terminal device.
Figure 13:
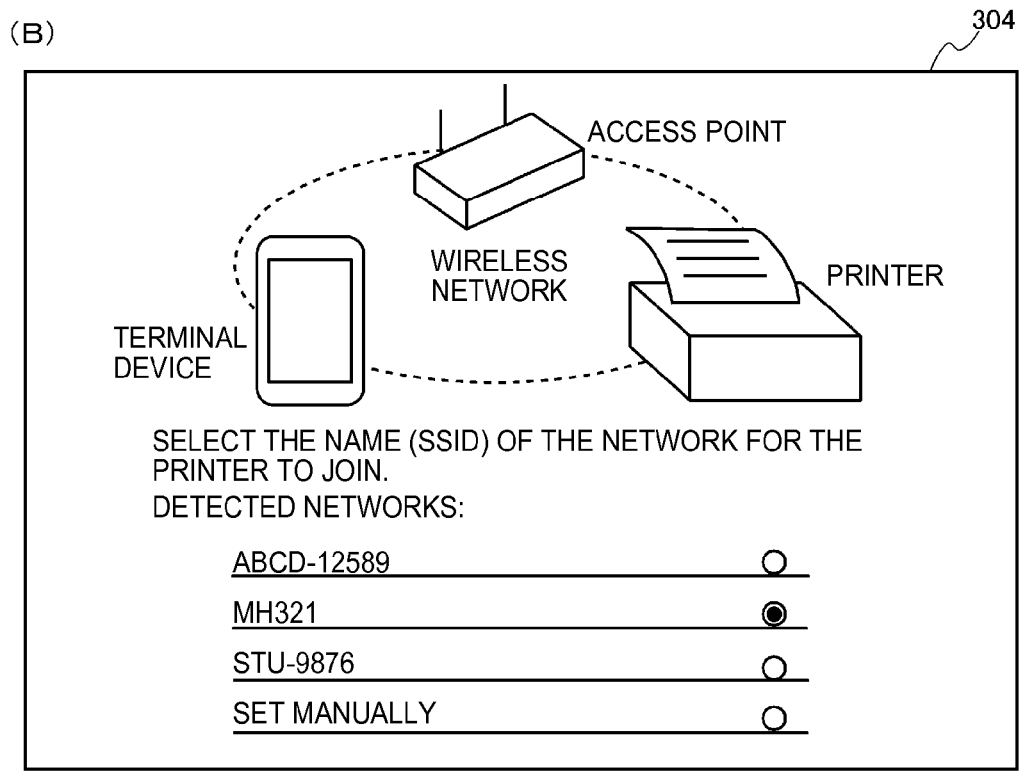

By setting the same SSID and pass phrase as the second wireless communication unit 34 in the first wireless communication unit 22, the first wireless communication unit 22 and second wireless communication unit 34 connect wirelessly, and the printer 2 and the terminal 3 can directly communicate wirelessly 1:1 (steps S3, S25). When wireless communication is established and the printer 2 and terminal 3 communicate 1:1 wirelessly, the connection control unit 56 of the terminal 3 may display a connecting window 303 such as shown in FIG. 13 (A) on the touch panel 32. The connecting window 303 is a screen that tells the operator that the terminal 3 is communicating to set up communication with the printer 2. The connecting window 303 may also include a progress report showing steps in the printer 2 communication setup process and how far the process has progressed.

When connecting with the terminal 3, the printer 2 operates as an access point, and connects wirelessly 1:1 with the terminal 3. FIG. 4 illustrates a direct, 1:1 wireless connection between the printer 2 and terminal 3 in the first mode.

When the second wireless communication unit 34 connects in the first mode to the printer 2, the connection control unit 56 of the terminal 3 sends a Ping command (check connection command) to the printer 2 to check the connection to the printer 2 (step S4). When the Ping command (check connection command) is received (step S26), the connection control unit 26 of the printer 2 sends the MAC address of the printer 2 to the terminal 3 that sent the Ping command (check connection command) (step S27). When the MAC address is received (step S5), the connection control unit 56 of the terminal 3 stores the received MAC address in RAM 53. The connection control unit 56 may alternatively display the MAC address received for the printer 2 on the touch panel 32. If there are multiple printers 2, for example, this enables determining which of the printers 2 is the printer 2 connected to the terminal 3.

The connection control unit 56 of the terminal 3 then sends to the printer 2 an acquisition request for the communication settings of the printer 2. The connection control unit 26 of the printer 2 then returns the communication settings of the printer 2 to the terminal 3 according to the acquisition request from the terminal 3 (step S28). Note that the communication settings sent to the terminal 3 here are the same as the content of the communication settings printed in step S22, and include the SSID, communication protocol, encryption method, pass phrase, and IP address or other communication address. These communication settings are also the information set based on the connection settings received from the terminal 3 in step S29 described below. If this iteration of the process is the first time the power turned on after factory shipping, the printer 2 has not acquired the connection settings from the terminal 3. In this event, the connection control unit 26 of the printer 2 sends the factory communication settings to the terminal 3. The connection control unit 56 of the terminal 3 receives the communication settings sent from the printer 2 (step S6), and stores the settings in RAM 53.

Next, the connection control unit 56 of the terminal 3 receives input of the connection settings of the wireless network 5A to which to newly connect the printer 2 (step S7). The connection control unit 56 displays on the touch panel 32 an input screen for inputting, for example, the network name (SSID), pass phrase, and IP address of the wireless network 5A to which the printer 2 is to connect. If the printer 2 connects to the wireless network 5A created by an access point 4A installed in the business, for example, the network name of the wireless network 5A is the SSID of the wireless network 5A.

If previously registered connection settings are stored in nonvolatile memory 54, the connection control unit 56 displays a list of those connection settings on the touch panel 32. The connection control unit 56 may also display the communication settings received in step S6 on the touch panel 32 as the connection settings. The user then selects the network name (SSID) for connecting the printer 2 from the displayed list of connection settings. The user may also use the touch panel 32 to change the displayed connection settings and input a new network name. When a network name (SSID) is selected, the connection control unit 56 displays an input screen for the pass phrase set for the selected network and the communication address (IP address, MAC address) of the printer 2 on the touch panel 32. Note that communication address may be input directly by the user using the touch panel 32, or by DHCP, for example.

In step S7 the connection control unit 56 displays a communication settings input window for input related to the communication settings on the touch panel 32. Examples of communication settings input windows are shown in FIG. 13 (B) to FIG. 15 (B).

The communication settings input window 304 shown in FIG. 13 (B) is a window for inputting the SSID set in the printer 2, that is, the SSID of the wireless network 5A. Included in the communication settings input window 304 is a list of the SSIDs of the wireless networks the terminal 3 found by the second wireless communication unit 34, and enables selecting an SSID from the listed SSIDs. While the communication settings input window 304 is displayed, manual setting can be selected by touching the touch panel 32 as the method of setting the SSID, in which case the SSID can be input and set directly.

Figure 14:
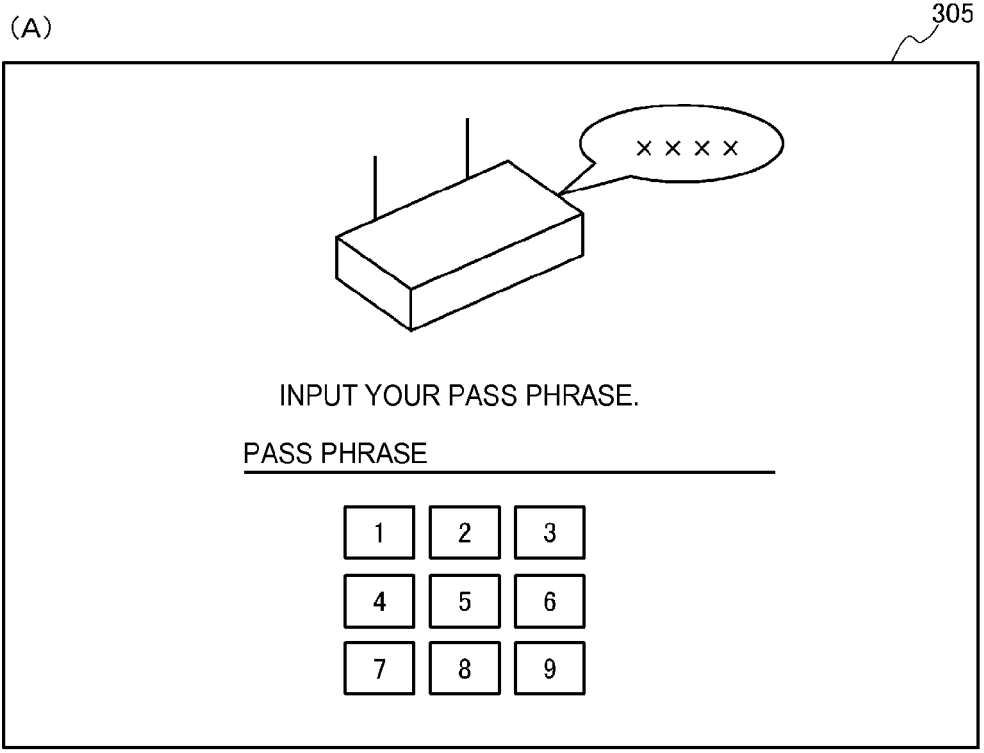
FIG. 14 shows examples of screens displayed on the terminal device.
Figure 14:
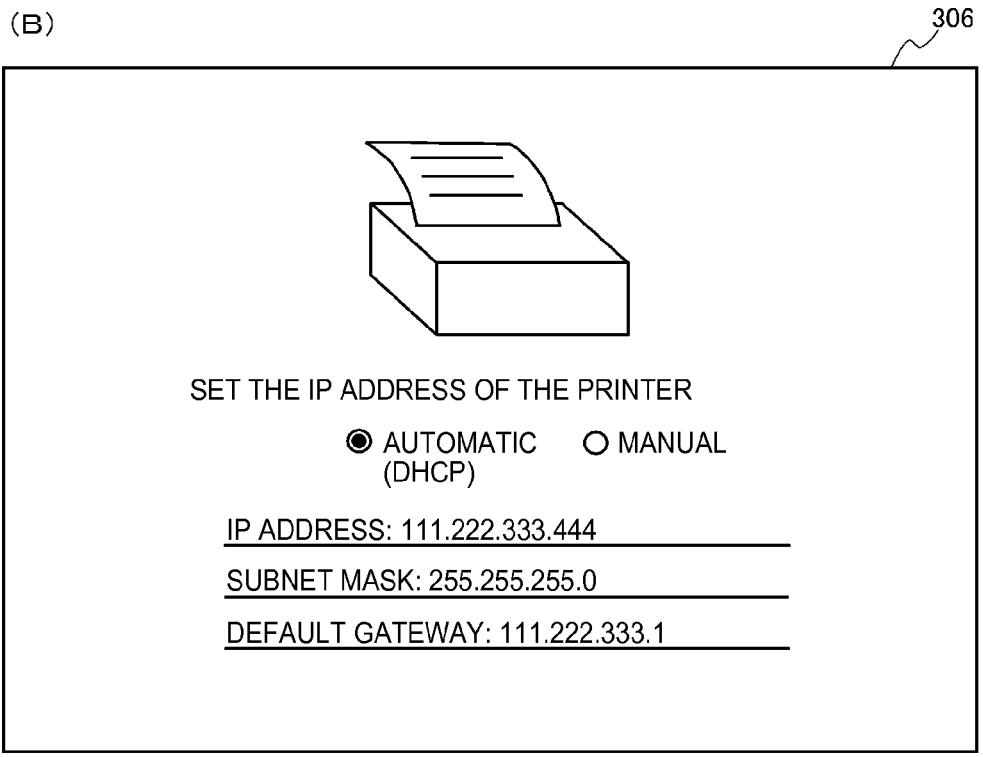

The communication settings input window 305 shown in FIG. 14 (A) is a window for input the key information set in the printer 2, or more specifically the pass phrase of the wireless network 5A. A virtual keypad for inputting the pass phrase is displayed in the communication settings input window 305. This communication settings input window 305 may also be configured to enable inputting the encryption method.

The communication settings input window 306 shown in FIG. 14 (B) is a window for inputting network information (such as the IP address) for connecting the printer 2 to the wireless network 5A. Network information including the IP address can be automatically acquired from a DHCP server and set in communication settings input window 306. The currently set network information is also displayed in the communication settings input window 306, and network information can be manually input using a virtual keyboard, for example, by touch operations on the displayed communication settings input window 306.

Figure 15:
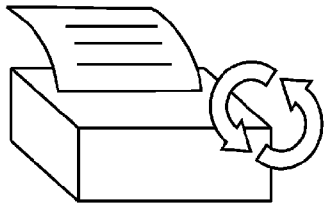
FIG. 15 shows examples of screens displayed on the terminal device.
Figure 15:
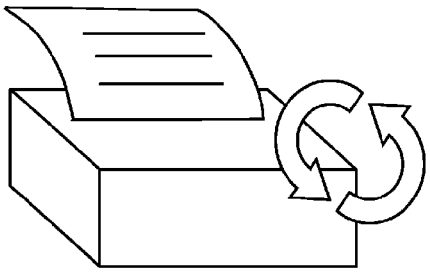

Next, as shown in FIG. 15 (A), the connection control unit 56 displays on the touch panel 32 a communication settings confirmation window 307 for confirming the communication settings input to the communication settings input windows 304, 305, 306. After confirming the communication settings in this communication settings confirmation window 307, the connection control unit 56 executes an operation to send the communication settings to the printer 2.

More specifically, when the connection control unit 56 of the terminal 3 receives the connection settings input by operations on the touch panel 32, for example, it sends the received connection settings to the printer 2 (step S8). When the connection control unit 26 of the printer 2 then receives the connection settings (step S29), it sets the received connection settings in the first wireless communication unit 22, and restarts the printer 2 (step S30). By restarting the printer 2, the 1:1 wireless connection between the terminal 3 and printer 2 is cancelled. After starting restarting the printer 2, the connection control unit 56 may display the guidance window 308 shown in FIG. 15 (B) on the touch panel 32. This guidance window 308 is a screen indicating that the communication settings are completed and the printer 2 will restart.

Operation of the terminal 3 after step S8, and the operation of the printer 2 after step S30 are described below with reference to the flow chart in FIG. 11.

When the connection control unit 56 of the terminal 3 sends the connection settings to the printer 2, it sets settings corresponding to the connection settings sent to the printer 2 in the second wireless communication unit 34. More specifically, the network name (SSID), wireless communication encryption method, and other parameters are set in the second wireless communication unit 34 by the connection control unit 56 identically to the connection settings sent to the printer 2. However, the communication address of the terminal 3 is set in the second wireless communication unit 34 as the IP address or other communication address. The IP address setting may be automatically allocated by a DHCP server. The connection control unit 56 may also display on the touch panel 32 a window prompting input of a generic IP address that is used only for the print test, and may communicate using the IP address received through the touch panel 32. The second wireless communication unit 34 set up for connection by the connection control unit 56 then communicates wirelessly with the access point 4A shown in FIG. 8 and connects to the wireless network 5A created by the access point 4A (step S9).

When connection settings are received from the terminal 3, the connection control unit 26 of the printer 2 likewise stores the received connection settings in RAM 243 and registers the settings in the first wireless communication unit 22. The first wireless communication unit 22 configured by the connection control unit 26 then communicates wirelessly with the access point 4A shown in FIG. 8 and connects to the wireless network 5A created by the access point 4A (step S31). As a result, the terminal 3 and printer 2 join the wireless network 5A created by the access point 4A as child devices, and can communicate wirelessly through the access point 4A.

If step 22 returns NO, the connection control unit 26 of the printer 2 reads the connection settings that were previously set and stored in the nonvolatile memory 244, and registers the read connection settings in the first wireless communication unit 22 (step S31).

When the terminal 3 and printer 2 are connected to the access point 4A, the connection control unit 56 of the terminal 3 displays messages indicating that the terminal 3 connected to the access point 4A and asking whether or not to run the print test on the printer 2. If an operation instructing running the print test is received through the touch panel 32, the connection control unit 56 asks the transaction processing unit 55 to create a test pattern for the print test. The transaction processing unit 55 generates the test pattern requested from the connection control unit 56, and passes the test pattern to the connection control unit 56.

When the test pattern is acquired from the transaction processing unit 55, the connection control unit 56 sends the acquired test pattern and an print test execution request to the printer 2 (step S10). The connection control unit 56 references the connection settings registered in the second wireless communication unit 34, gets the IP address of the printer 2, and sends the test pattern to the acquired IP address (step S10).

When a print test execution request is received (step S32), the connection control unit 26 of the printer 2 passes the received test pattern to the print control unit 25. The print control unit 25 controls the print unit 23 and prints the test pattern on receipt paper (step S33). The print control unit 25 passes the result of printing the test pattern to the connection control unit 26. The connection control unit 26 generates and sends to the terminal 3 a termination state flag indicating whether the print test was normal or not based on the test result acquired from the print control unit 25 (step S34).

Figure 9:
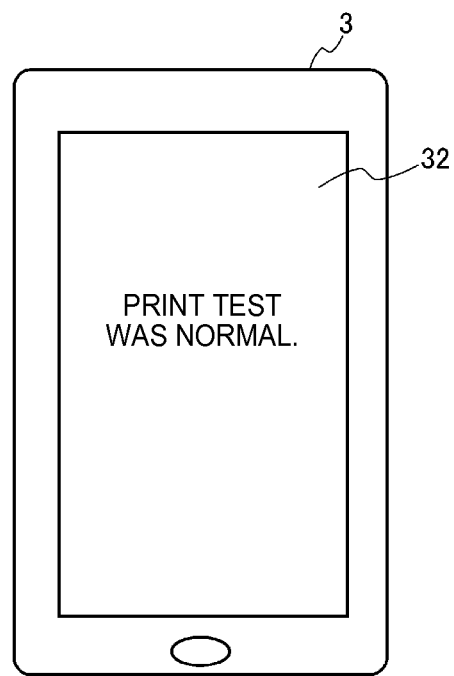
FIG. 9 shows a display sample on the touch panel.

When the termination state flag is received from the printer 2 (step S11), the connection control unit 56 of the terminal 3 displays content corresponding to the received termination state flag on the touch panel 32 (step S12). When the termination state flag indicates the test was normal, the connection control unit 56 displays a message indicating the print test was normal on the touch panel 32 (FIG. 9). If the termination state flag indicates the print test was not normal, the connection control unit 56 displays a message indicating the print test failed on the touch panel 32. Note that the connection control unit 56 also displays a message indicating the print test failed on the touch panel 32 if a specific timeout period passes before the termination state flag is received from the printer 2 to which the test pattern was sent.

When the print test ends, the connection control unit 56 of the terminal 3 changes the communication settings of the second wireless communication unit 34. For example, the connection control unit 56 may communicate wirelessly in the second mode with the access point 4B and connect wirelessly to the access point 4B.

As described above, a communication system 1 according to this embodiment of the disclosure includes a printer 2 and a terminal device 3. The printer 2 is a new device that connects to a wireless network 5A. The terminal 3 has a second wireless communication unit 34 that communicates, and configures the connection of the printer 2 to the wireless network 5A. The terminal 3 communicates with the printer 2 through the second wireless communication unit 34, and sets up the printer 2 connection. The terminal 3 also connects by the second wireless communication unit 34 to the wireless network 5A, and can request the printer 2 execute a specific operation through the wireless network 5A. The terminal device can therefore control setting up a new connecting device that connects to a first network, and the terminal device can request the connecting device to execute a specific operation. As a result, operation of a connecting device can be confirmed after setting up the device using a terminal device that controls connection settings. As a result, communication related settings can be easily registered, and device operation after communication is enabled can be easily confirmed.

The terminal 3 controls a second wireless communication unit 34 to connect to the wireless network 5A using settings corresponding to the connection settings registered in the printer 2. The terminal 3 can therefore be connected to the wireless network 5A to which the printer 2 was connected.

When the second wireless communication unit 34 is connected to a wireless network 5B different from wireless network 5A, the terminal 3 changes the settings of the second wireless communication unit 34 to connect to the printer 2. The terminal 3 then changes the settings of the second wireless communication unit 34 and connects to the wireless network 5B after registering the connection settings. The connection settings of the printer 2 can therefore be made using a terminal 3 connected to a different wireless network 5B than the wireless network 5A to which the printer 2 is connected, and after setting up the printer 2 connection, the terminal 3 can connect to the wireless network 5B and return to the wireless network 5B.

The printer 2 has a first wireless communication unit 22, and is configured to communicate wirelessly with the second wireless communication unit 34 of the terminal 3. The terminal 3 communicates with the printer 2 through the second wireless communication unit 34, and configures the connection settings of the first wireless communication unit 22 to connect to the wireless network 5A. The printer 2 and terminal 3 can therefore connect wirelessly, and the connection settings of the connecting device can be configured by wireless communication.

The terminal 3 has a touch panel 32 for displaying guidance for input related to requesting executing a specific operation, and receiving input related to requesting executing a specific operation. The terminal 3 requests the printer 2 to execute a specific operation according to the input received from the touch panel 32. When input related to requesting executing a specific operation is received, the connecting device can be requested to execute the specific operation.

The terminal 3 also displays on the touch panel 32 at least one of the result of requesting the printer 2 execute a specific operation, and the result of the printer 2 executing the specific operation. The user can therefore know at least one of the result of requesting the printer 2 execute a specific operation, and the result of the printer 2 executing the specific operation, from the content on the touch panel 32.

The second wireless communication unit 34 of the terminal 3 and the first wireless communication unit 22 of the printer 2 wirelessly connect directly to each other. The printer 2 and terminal 3 can connect easily 1:1, and the connection settings of the wireless network 5A to which the printer 2 connects can be controlled by the terminal 3.

A preferred embodiment of the disclosure is described above. The disclosure, however, is not limited to the foregoing embodiment, and can be modified and improved in many ways without departing from the scope of the accompanying claims.

For example, when the terminal 3 configures the connection settings of the wireless network 5A to which a new printer 2 connects, the terminal 3 also connects to the wireless network 5A and executes a print test of the printer 2. However, there is no need for the terminal 3 to connect to the wireless network 5A to which the printer 2 connected when the printer 2 is not controlled to execute a print test or other specific operation, or when the print test of the printer 2 is executed by a different terminal 3 already connected to the wireless network 5A. More specifically, when the terminal 3 configures the connection settings of the wireless network 5A to which a printer 2 newly connects, the terminal 3 terminates (cancels) the wireless connection to the printer 2. For example, the connection control unit 56 that terminated (cancelled) the wireless connection to the printer 2 may connect wirelessly to the access point 4B to which it was connected before connecting wirelessly 1:1 to the printer 2, and return to the wireless network 5B.

The foregoing embodiment describes an example using a terminal device 3 to configure a new connection between a printer 2 and the wireless network 5A, but the disclosure is not limited to a wireless network 5A, and can also be used effectively when connecting a printer 2 to a wired network. For example, a NIC (LAN card) that connects to a wired network may be disposed in the printer 2 as the connecting device, and the communication settings of this NIC may be set from the terminal 3 by wireless communication as shown in FIG. 4.

The disclosure is described above using a printer 2 as an example of a connecting device, but the disclosure is not so limited. The connecting device may be, for example, a scanner for optically reading images, a display device for displaying images, or other type of device.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A communication system comprising:
    a connecting device that newly connects to a network and is configured to communicate via a configuration link; and
    a terminal device that has a communication unit to communicate, and is configured to perform a connection setting in the connecting device related to connecting the connecting device to the network;
    wherein the terminal device changes a setting of the communication unit and connects to the connecting device via the configuration link, and communicates with the connecting device by the communication unit to make connection settings in the connecting device,
    wherein after completing the connection settings, the terminal device operates the communication unit using settings corresponding to the connection settings registered in the connecting device to connect to the network, and goes to a state enabling requesting the connecting device to execute a specific operation through the network, and
    wherein, the connecting device creates the configuration link and prints out communication settings for connecting to the terminal device via the configuration link after being powered on for the first time after factory shipping.

2. The communication system described in claim 1, wherein:
    the connecting device has a first wireless communication unit, and the communication unit of the terminal device is configured to communicate wirelessly; and
    the terminal device communicates by the communication unit with the connecting device, and configures the connection settings of the first wireless communication unit to connect to the network.

3. The communication system described in claim 1, wherein:
    the terminal device has a display unit to display guidance for input related to requesting executing a specific operation, and an input unit to receive input related to requesting executing a specific operation, and requests the connecting device to execute the specific operation according to the input received by the input unit.

4. The communication system described in claim 3, wherein:
    the terminal device displays on the display unit at least one of the result of requesting the connecting device to execute a specific operation, and the result of the connecting device executing the specific operation.

5. The communication system described in claim 2, wherein:
    the communication unit of the terminal device and the first wireless communication unit of the connecting device wirelessly connect directly to each other.

6. A communication setup method wherein a terminal device with a communication unit newly configures connection settings of a connecting device to connect to a network, the method comprising:
    changing a setting of the communication unit and connecting to the connecting device on a configuration link,
    communicating with the connecting device, by the communication unit, and registering connection settings related to connecting to the network in the connecting device, and
    after completing the connection settings, the terminal device operating the communication unit using settings corresponding to the connection settings registered in the connecting device to connect to the network, and going to a state enabling requesting the connecting device to execute a specific operation through the network,
    wherein the connecting device creates the configuration link and prints out communication settings for connecting to the terminal device via the configuration link upon being powered on for the first time after factory shipping of the connecting device.

7. The communication setup method described in claim 6, wherein:
    the connecting device has a first wireless communication unit, and the communication unit of the terminal device is configured to communicate wirelessly; and
    the terminal device communicates by the communication unit with the connecting device, and configures the connection settings of the first wireless communication unit to connect to the network.

8. The communication setup method described in claim 6, wherein:
    the terminal device has a display unit to display guidance for input related to requesting executing a specific operation, and an input unit to receive input related to requesting executing a specific operation, and requests the connecting device to execute the specific operation according to the input received by the input unit.

9. The communication setup method described in claim 8, wherein:
    the terminal device displays on the display unit at least one of the result of requesting the connecting device to execute a specific operation, and the result of the connecting device executing the specific operation.

10. The communication setup method described in claim 7, wherein:
    the communication unit of the terminal device and the first wireless communication unit of the connecting device wirelessly connect directly to each other over the configuration link.

11. A terminal device comprising:
    a communication unit that can communicate with a connecting device to newly connect the connecting device to a network via a configuration link; and
    a control unit that controls the communication unit;
    wherein the control unit is configured to:
        change a setting of the communication unit and connects to the connecting device on a network, communicate with the connecting device by the communication unit, and register connection settings related to connecting to the network in the connecting device; and after registering the connection settings, the control unit operates the communication unit using settings corresponding to the connection settings registered in the connecting device to connect to the network, and goes to a state enabling requesting the connecting device to execute a specific operation through the network, wherein the connecting device is configured to create the configuration link and prints out communication settings for connecting to the terminal device via the configuration link upon being powered on for the first time after factory shipping of the connecting device.

12. The terminal device described in claim 11, wherein:

the terminal device has a display unit to display guidance for input related to requesting executing a specific operation, and an input unit to receive input related to requesting executing a specific operation, and requests the connecting device to execute the specific operation according to the input received by the input unit.

13. The terminal device described in claim 11, wherein:

the terminal device displays on the display unit at least one of the result of requesting the connecting device to execute a specific operation, and the result of the connecting device executing the specific operation.

* * * * *